United States Patent [19]

Erwin, Jr.

[11] 4,098,113
[45] * Jul. 4, 1978

[54] TEMPERATURE CONTROLLED FUEL SYSTEMS FOR ENGINES

[76] Inventor: Curtis L. Erwin, Jr., 5805 SE. Gladstone, Portland, Oreg. 97236

[ * ] Notice: The portion of the term of this patent subsequent to Apr. 13, 1993, has been disclaimed.

[21] Appl. No.: 665,275

[22] Filed: Mar. 9, 1976

Related U.S. Application Data

[62] Division of Ser. No. 456,264, Mar. 29, 1974, Pat. No. 3,949,602.

[51] Int. Cl.² .............................................. G01F 9/00
[52] U.S. Cl. .................................... 73/113; 73/119 A
[58] Field of Search ................ 73/114, 113, 233, 196, 73/119 A, 229, 198, 194 E; 123/32 H

[56] References Cited

U.S. PATENT DOCUMENTS

| | | | |
|---|---|---|---|
| 2,085,224 | 6/1937 | Krueger | 73/198 X |
| 2,103,947 | 12/1937 | Holmes | 123/122 H UX |
| 2,692,164 | 10/1954 | Lockwood | 73/196 X |
| 2,713,272 | 7/1975 | Granberg | 73/233 X |
| 3,448,609 | 6/1969 | Sibeud | 73/113 |
| 3,695,097 | 10/1972 | Michalowicz | 73/113 |
| 3,714,823 | 2/1973 | Wilkens et al. | 73/113 |
| 3,750,463 | 8/1973 | Erwin, Jr. | 73/113 |

Primary Examiner—Jerry W. Myracle
Attorney, Agent, or Firm—Eugene M. Eckelman

[57] ABSTRACT

The invention includes temperature controlled fuel systems which may or may not have measuring devices therein. Systems of the invention may be used with engines which return unburned fuel, and treatment apparatus may be included in such systems for cooling the fuel, removing bubbles or the like. In one system having the treating apparatus, a fuel line conducts fuel from the fuel supply to the engine in bypassing relation to the treatment apparatus. One concept uses a single measuring device and another concept includes two measuring devices which give a differential output of fuel measurement. Indicating or recording devices or both are responsive to single or dual measuring devices to indicate fuel flow. Also, in the fuel system which is used with engines that return unburned fuel and which uses a single measuring device, such measuring device is connected prior to the combining of the return fuel and the fuel supply for the engine. Compensating structure to correct the indications of the indicator or recorder due to variations in the physical characteristics of the fuel may also be employed in the system.

34 Claims, 19 Drawing Figures

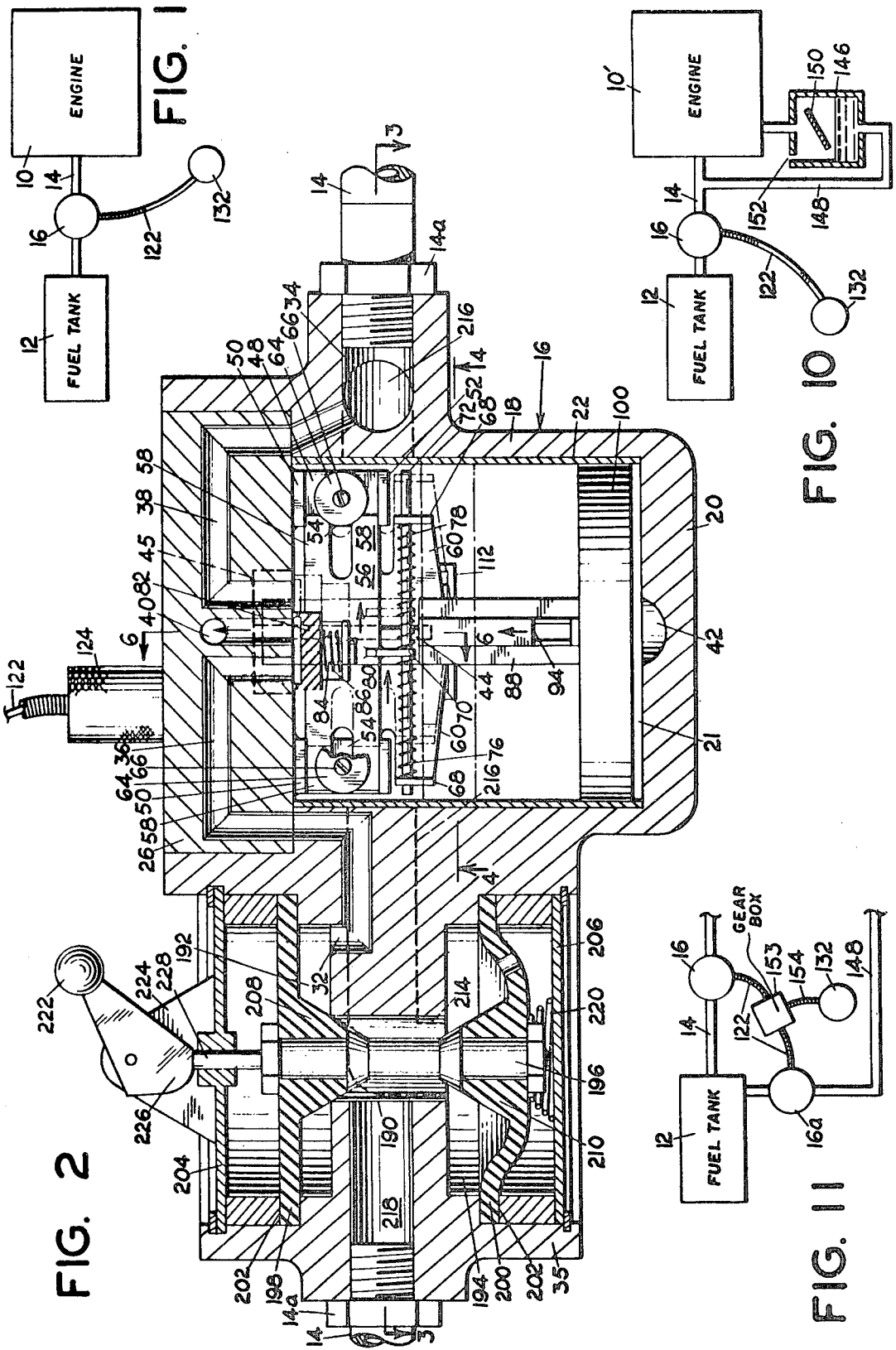

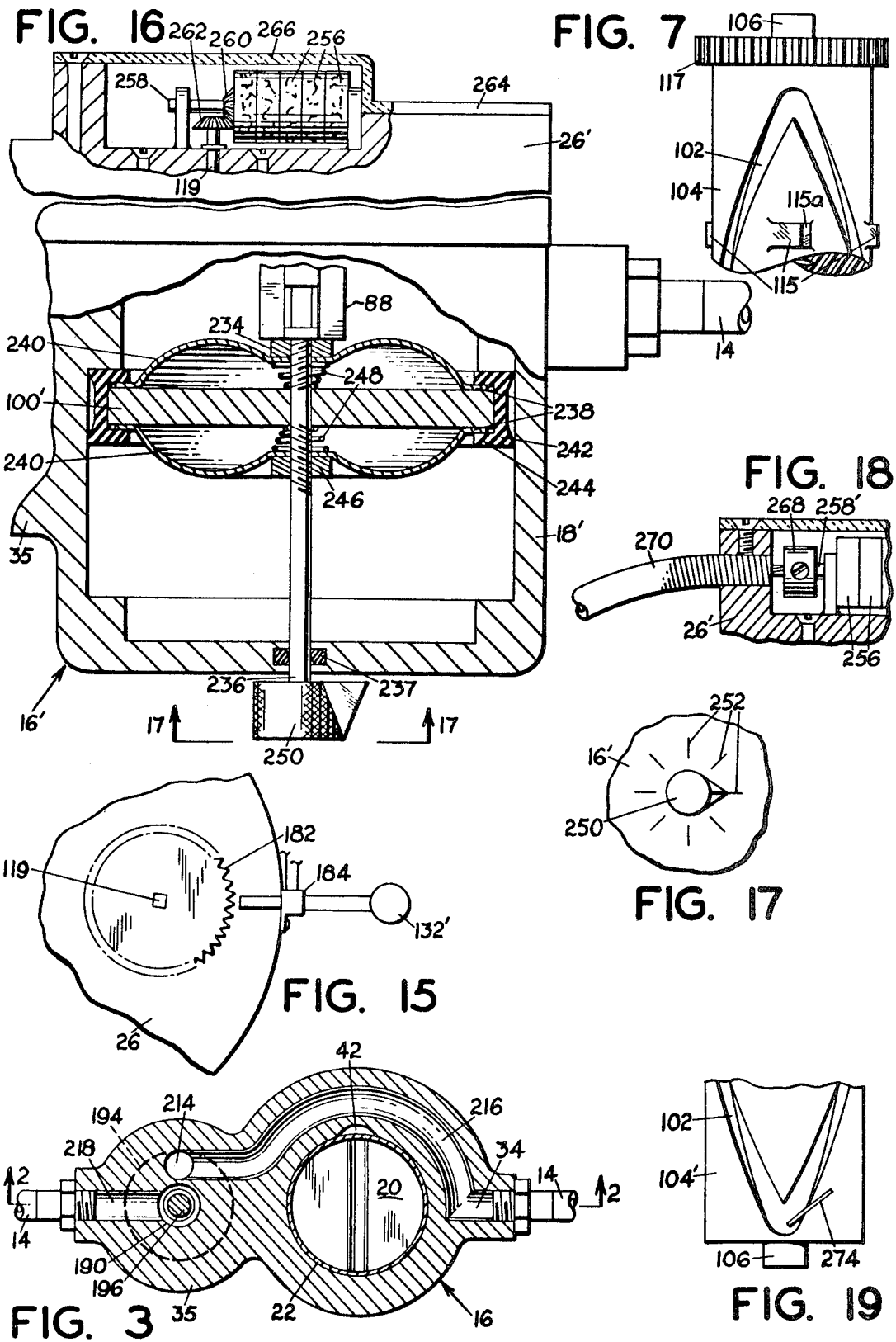

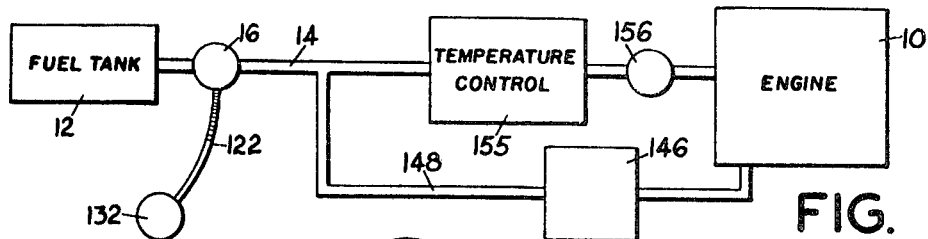
FIG. 12
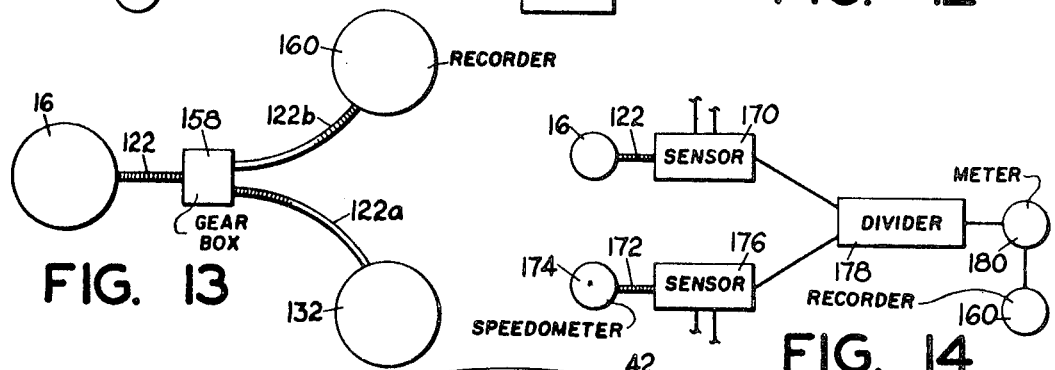
FIG. 13
FIG. 14
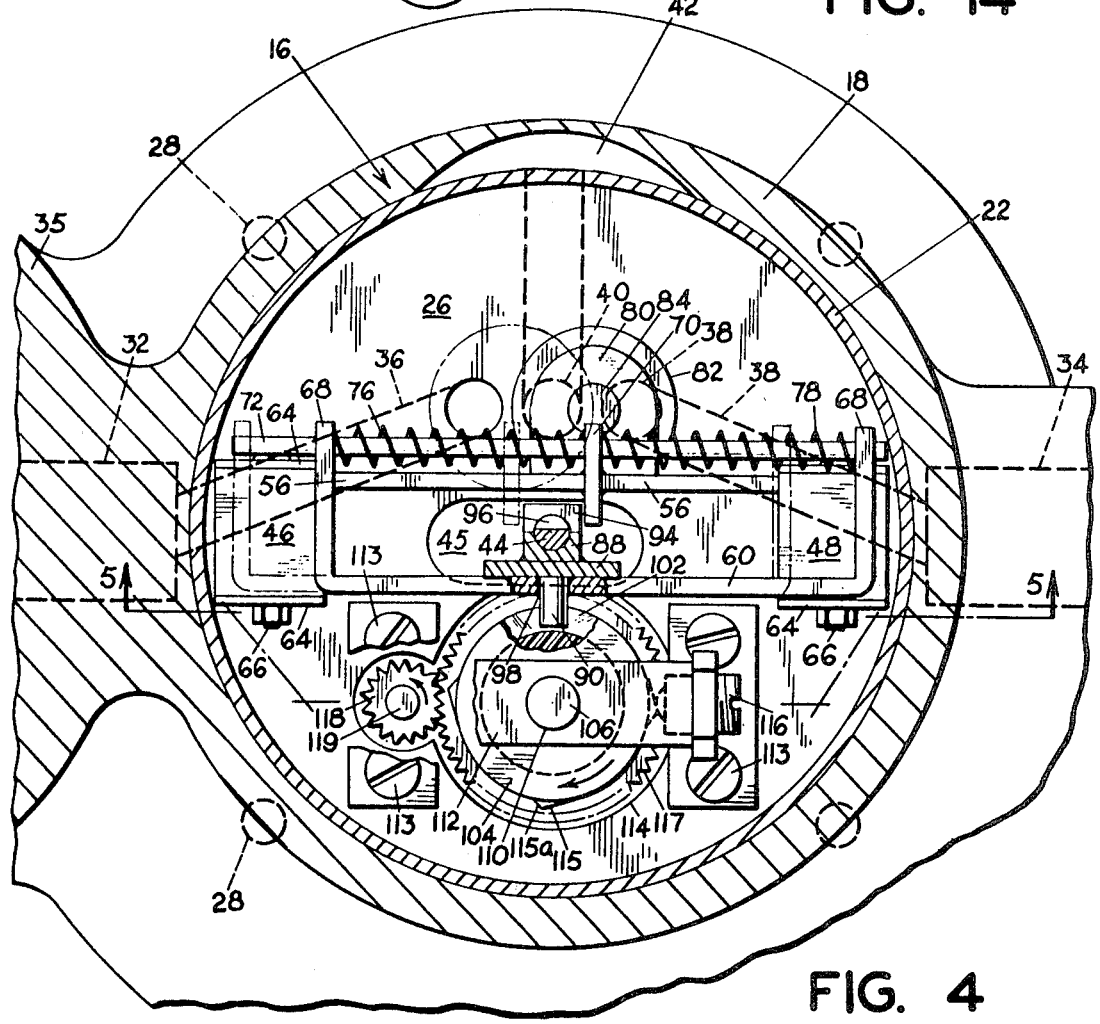
FIG. 4

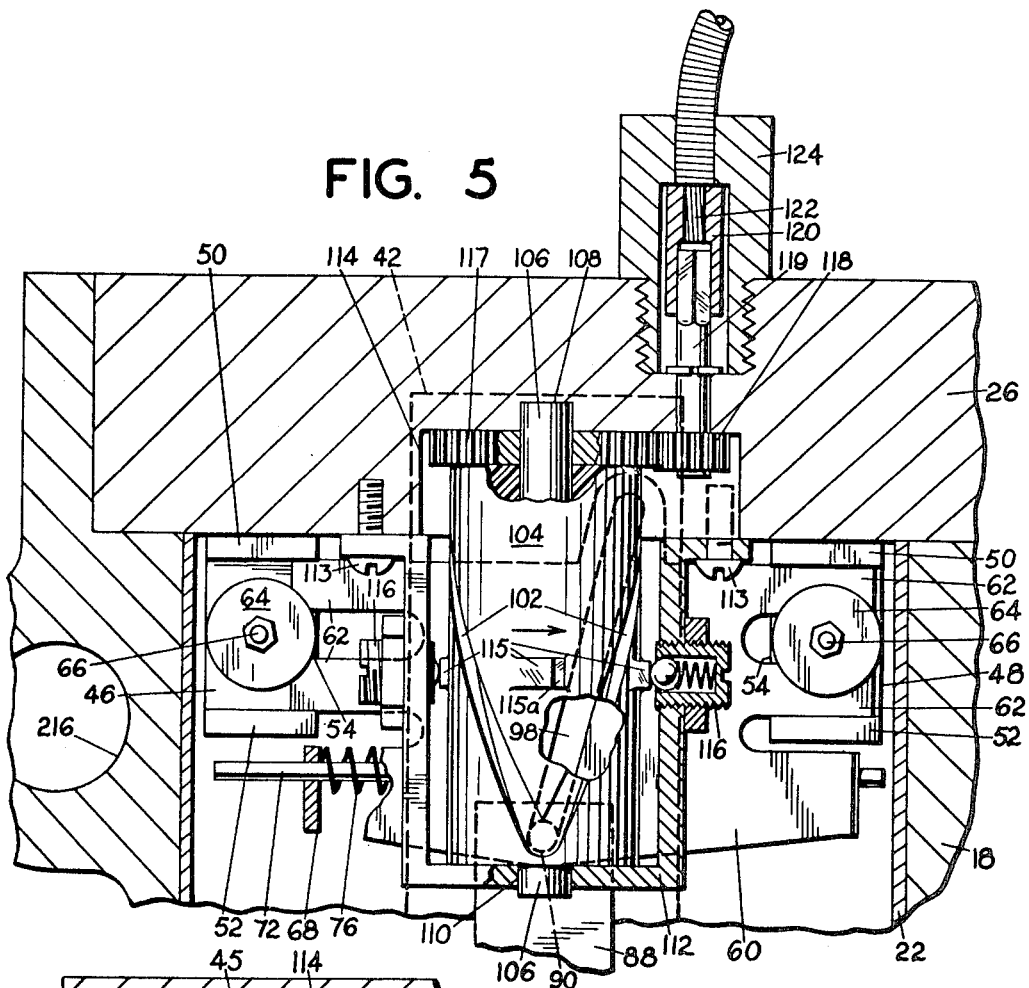
FIG. 5
FIG. 6
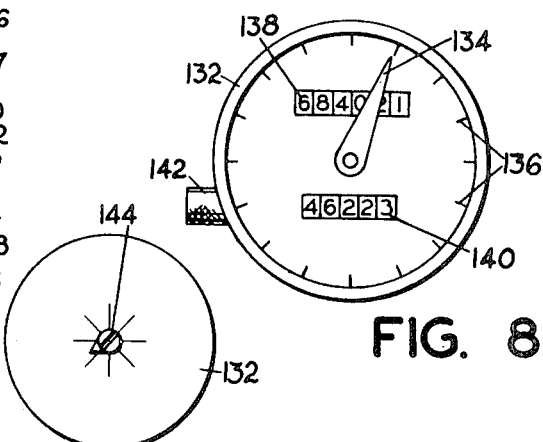
FIG. 8
FIG. 9

TEMPERATURE CONTROLLED FUEL SYSTEMS FOR ENGINES

REFERENCE TO PRIOR APPLICATIONS

This is a division of application Ser. No. 456,264, filed Mar. 29, 1974 for Fuel Use Rate Meter For Engines, now U.S. Pat. No. 3,949,602.

BACKGROUND OF THE INVENTION

This invention relates to a meter for measuring the rate of fluid flow such as for determining the rate of fuel usage in an engine.

The efficient functioning of engines comprises an important factor in the operational aspect of trucking firms, marine firms, and other firms which use engine driven equipment. These engines are tested periodically for output efficiency to determine whether or not repair or overhaul is necessary. Various testing methods are used, a common one employing a dynamometer. Another method to determine whether the engine is to be repaired or overhauled is merely by considering total miles run or hours operated. With the use of a dynamometer, or other methods now used, a precise analysis of engine condition is not altogether possible because of variables which may exist from engine to engine such as ignition conditions.

The most efficient method of determining engine condition is to ascertain the amount of fuel consumed by the engine per unit of time. Prior devices have not accomplished this method of testing in a commercially feasible manner because the meters used, while showing fuel usage, do not give a direct reading of the rate that the fuel is used. In prior devices, it is thus necessary to make computations from the meter reading, which of course is inconvenient and many times inaccurate. Another disadvantage of prior devices is that they do not compensate for the expansion or contraction of fuel due to variations in temperature, and thus the fuel is not accurately metered, particularly in slow flow systems such as fuel feed systems for engines. Although temperature conversion tables are available, based on a temperature constant, for determining volume of flow, such computing method is often inaccurate and always inconvenient. In some cases the use of conversion tables is also impractical.

In view of the above, means heretofore used for determining the condition of engines by ascertaining fuel consumption or miles or hours logged are not considered to be adequate because such means do not indicate with the necessary preciseness the condition of an engine. This may result in overhaul or repair which is not necessary, or on the other hand engines may remain in operation when in fact they should be overhauled or repaired.

SUMMARY OF THE INVENTION

It is therefore a primary objective of the present invention to provide a meter for use in a fluid flow system which indicates directly the rate of fluid flow. Such a meter is particularly adapted for use in conjunction with a vehicle engine to show the rate at which fuel is being consumed and thus to indicate the mechanical condition of the engine.

Other objects of the present invention are to provide a meter of the type described which includes adjustment means compensating for temperature variations; which has a structure wherein indicating means forming a part thereof may be remotely located from the drive means of the meter; which may be combined with other treating means such as temperature control means and bubble removing means; and which includes a lever-operated bypass valve capable of either directing fuel through the meter or around the meter.

Additional objects will become apparent from the following description taken in connection with the accompanying drawings.

BRIEF DESCRIPTION OF THE DRAWINGS

FIG. 1 is a diagrammatic view of a fuel system including the present fuel use rate meter for engines;

FIG. 2 is a vertical sectional view of the present meter, taken on the line 2—2 of FIG. 3;

FIG. 3 is a horizontal sectional view taken on the line 3—3 of FIG. 2, this view being reduced in size relative to FIG. 2 and having some of the parts omitted;

FIG. 4 is an enlarged, horizontal sectional view taken on the line 4—4 of FIG. 2;

FIG. 5 is an enlarged vertical fragmentary sectional view taken on the line 5—5 of FIG. 4;

FIG. 6 is a fragmentary vertical sectional view taken on the line 6—6 of FIG. 2;

FIG. 7 is an elevational view of a barrel cam which comprises a part of internal drive means for the meter and which is shown apart from other structure for clarity;

FIG. 8 is a face view of an indicating instrument which forms a part of the present system;

FIG. 9 is a rear view of the instrument of FIG. 8 showing adjustment means thereon;

FIGS. 10 through 14 comprise diagrammatic views of various fuel systems incorporating the present rate meter;

FIG. 15 is a fragmentary plan view of an electrically operated pickup system between drive means of the meter and indicating means;

FIG. 16 is an elevational view, partly broken away, showing a modified form of rate meter;

FIG. 17 is a fragmentary bottom plan view taken on the line 17—17 of FIG. 16;

FIG. 18 is a fragmentary sectional view illustrating a modified form of indicator drive means which may be associated with the structure of FIG. 16; and FIG. 19 is a fragmentary elevational view showing a modified structure of the barrel cam means of FIG. 7.

DETAILED DESCRIPTION OF PREFERRED EMBODIMENTS

With particular reference to the diagrammatic view of FIG. 1, an engine is designated by the numeral 10 and conventional fuel feed means therefor comprising a fuel tank and a fuel line are designated by the numerals 12 and 14, respectively.

Forming a part of the present invention is a fuel meter apparatus 16 which upon being driven by fluid flow operates in a manner to provide accurate information in a direct reading on an instrument to indicate operating conditions of an engine, as will be more apparent hereinafter.

The meter 16 is structurally detailed in FIGS. 2 through 6. It comprises an outer casing 18 of cylindrical shape. Casing 18 has a bottom wall 20 with projections 21 thereon for a purpose to be described. A sleeve 22, forming a cylinder, is disposed within the casing 18. The casing has a head 26 removably fitted therein.

As best shown in FIGS. 2 and 4, the casing 18 has an inlet 32 and an outlet 34 disposed substantially in diametrical relation. The meter apparatus is associated with a bypass valve 35 to be described hereinafter which preferably is formed with the casing 18 in a common casting. The housing for the meter and bypass valve is installed in the fuel line 14 by conventional means, with cut ends of the fuel line engaging the bypass valve and outlet 34 in the casing 18 by suitable fittings 14a. A passageway 36 in the head 26 leads from the inlet 32 and opens into the interior of the meter casing, and a passageway 38 also in the head leads from the outlet 34 and opens into the interior of the meter casing in laterally spaced relation to the outlet of the port 36. A third passageway 40 extends from a point of inlet interiorly of the meter casing which is disposed between the outlet of passageways 36 and 38 to a side of the head beyond the sleeve 22, best seen in FIG. 4. The head 26 and the outer casing 18 are cut away vertically in the plane of the outer end of the port 40 to provide a vertical passageway 42, FIG. 4. This recess establishes communication between the passageway 40 and the bottom of the casing. It will thus be seen that the passageway 36 leads from the inlet 32 to the top region of the casing, the passageway 40 leads from the said top region to the bottom of the casing, and the passageway 38 serves as an exhaust passageway connected to the meter outlet.

Valve mechanism will now be described to cause the fluid to flow alternately to the upper and lower cylinder regions and ultimately be exhausted through the outlet 34 for driving plunger means up and down in the cylinder. The head 26 has a depending, round center guide post 44 projecting into the casing at about the center thereof. This post projects integrally from the upper wall of a recess 45 cut in the lower surface of head 26. Also depending from the head 26 but at the sides, are two guide posts 46 and 48 disposed in diametrically opposed relation. Each of the posts 46 and 48 is formed with upper and lower flanges 50 and 52, respectively, and a central horizontal projection 54 on each side thereof, the flanges 50 and projection 54 being arranged to form horizontal slots between them which function as guides. Such guide slots are formed on two sides of the posts, namely, the front and rear, considering the front to be toward the viewer in FIG. 2.

The two posts 46 and 48 slidably support a valve support plate 56 on the front side thereof, best seen in FIGS. 2 and 4. Valve plate 56 has a pair of arms 58 on each end slidably received within the slots formed on the front side of the respective posts 46 and 48, the valve plate and arms being of selected dimension as to be reciprocatable horizontally a short distance within the casing. The posts similarly mount a loader plate or slide 60 on the other or rear side thereof, this plate also having spaced end arms 62, FIG. 5, received in a similar fashion in the post slots as are arms 58 of valve plate 56 on the other side, the loader plate and its arms also being dimensioned so as to be horizontally reciprocatable a short distance. Washers 64, FIGS. 4 and 5, are provided at the front and rear of the support posts and are held in place by bolts 66 to maintain the plates 56 and 60 within their particular slots of the posts. The loader plate 60 has two spaced arms 68 which project substantially at right angles from the body of the plate in a forward direction and forward beyond the body of the valve plate 56 and below the latter. Attached to the portion of the valve plate 56 between the arms on the loader plate 60 is a trip element 70 projecting both to the front and rear of the valve plate in parallel relation to the arms 68. A shaft 72 is supported between the arms 68 and also passes slidably through the trip element 70. A first compression spring 76 is supported on the shaft 72 between the trip element 70 and one arm 68 of the loader plate and a second compression spring 78 is supported on the shaft 72 between the trip element and the other arm 68.

Valve plate 56 has a forwardly extending right angle tab or ear 80, FIGS. 2 and 6, disposed below the region of the outlets of the three passageways 36, 38 and 40 into the casing, and mounted on such ear is an inverted cup valve 82 having a bottom stem 84 freely received within an opening provided therefor in the ear. A coil spring 86 is disposed between the ear and the cup valve about the stem and holds the valve firmly against the underside of the head 26. As illustrated, the valve diameter is such that its hollow or recess portion bridges at one time both the outlets from passageways 36 and 40 or alternatively both the outlets from passageways 38 and 40, depending upon the position of the valve in two limit positions.

Slidably mounted on the post 44 is a piston rod 88. This rod has a box-like shape, FIG. 6, which provides for slidable connection on the post, and projecting rearwardly from the piston rod at the upper end thereof is a drive pin or projection 90. Piston rod 88 has a lower transversely extending cut-out portion 94, respectively, and post 44 has a cut-out portion 96 which as will be more apparent hereinafter is adapted for lateral alignment with the cut-out portion 94 at a down position of the piston rod. Drive pin 90 projects into an upright angled slot 98 in the loader plate 60, and upon up and down movement of the piston rod, the loader plate is cammed first to one side and then to the other. Such movement of the loader plate in one direction compresses one of the springs 76 between one of the arms 68 and the trip element 70 and in the other direction compresses the other spring between the other arm 68 and the trip element 70.

Integrally connected to the bottom end of the piston rod 88 is a piston 100, FIGS. 2 and 6, having a liquid tight or positive seal engagement in a suitable manner at its peripheral edge with the inner wall of the sleeve 22.

As to the operation of the meter, reference is first made to FIG. 2 wherein the piston 96 is disposed at its lower position and the valve 82 connects the passageway 36 with the passageway 40. Fluid at this time is directed to the bottom of the casing through passageway 42 for lifting the piston. As the piston is driven upwardly the fluid above the piston in the casing is discharged through the outlet passageway 38. Also during the upward travel of the piston, the loader plate 60 is caused to be shifted to the right due to the camming action thereon by the drive pin 90, and this causes the spring 76 to be compressed since the valve plate 56 is restrained from moving correspondingly by engagement of its trip element 70 with the left side of the piston rod 88 in the area above cut-out portion 94. Such upward travel of the piston continues with progressive compression of the spring 76 until the bottom cut-out portion 94 of the piston rod reaches a height sufficient to allow the trip element 70 to pass therethrough, such upper position of the piston being shown in phantom lines in FIG. 2. This releases the valve plate for quick movement to the right under the action of the loaded spring 76. Since the cup valve 82 moves with the valve plate 56 it will then be disposed in a position connecting passageways 40 and 38. Fluid is then introduced to the upper area of the casing through inlet passageway 36 and the piston is driven downwardly, the exhaust flow of the fluid at the bottom of the piston being driven up through the vertical passageway 42 and out the outlet passageway 38. As the piston moves downward, it causes the loader plate 60 to be shifted to the left due to the camming action thereof from drive pin 90 and this causes the spring 78 to be compressed. Such downward travel of the piston continues until the trip element 70 passes over the top of the piston rod 88. Movement of the trip element 70 over the piston rod 88 allows the spring 78 to move the valve plate 56 to its other position and again cause the fluid to be directed under the piston. At this point the piston is slightly spaced above the projections 21 of the bottom of the cylinder. The cycle described above is repeated continuously as long as fuel is supplied to the meter.

Thus, as the piston reciprocates in its up and down movement, the loader plate 60 reciprocates laterally. As a part of the present invention, it is desired that the output of the meter be rotational and the structure to be described and best shown in FIGS. 4, 5 and 7, is provided to convert the lateral reciprocal motion of such loader plate to rotational movement for a purpose which will become more apparent hereinafter. The drive pin 90 on the piston rod 88 projects beyond the loader plate 60 and is engaged in a sinuous type slot 102 in the periphery of an upright barrel cam 104 disposed adjacent to the rear side of loader plate 60. This cam has projecting shaft ends 106 for rotatable support in the casing, the upper shaft end extending into a bearing socket 108 in the casing and the lower shaft end rotatably engaged in a bore 110 in a U-shaped bracket 112 secured to the underside of head 26 as by screws 113. The upper portion of the barrel cam 104 extends into a recess 114 in the head 26 to accomplish proper operation of the drive pin 90 in the cam slot. The cam slot 102 is of selected positioning and shape such that as the piston moves up and down, the drive pin 90 rotates the cam. The particular shape of the cam slot allows the drive pin to move around the ends thereof so that even though the pin is reversing direction in up and down movement, or vice versa, the cam rotates at a smooth uninterrupted speed. Cam 104 has surface projections 115 thereon disposed in spaced relation and having peak portions 115a. Engageable with the projections 115 is one or more, preferably two in diametrical relation, spring pressed ball assemblies 116 threadedly supported in the bracket. The spring pressed ball assemblies and projections 115 are arranged such that as the drive pin 90 is almost to an end or turn portion of the cam slot 102 the spring pressed ball thereof rides over the ridge 115 to urge the barrel cam rotatably in its forward direction and insure that the drive pin will turn the corner and continue into the next segment of the cam slot.

The upper end of barrel cam 104 integrally supports a drive gear 117 having meshing engagement with a driven gear 118 secured on an output shaft 119 rotatable in the head 26. Shaft 119 is secured to a coupling 120 which connects this shaft to a flexible cable 122. Such coupling is contained within a fitting 124 having a screw threaded mounting in the head 26.

With reference again to FIG. 1, as well as to FIGS. 8 and 9, the cable 122 leads to a tachometer-like instrument 132 having the usual indicating needle 134. This instrument is graduated in units 136 which depict fuel usage such as gallons or pounds. With proper calibration of the instrument 132 and lead angle of cam slot 102, an indication is available directly on the instrument of the fuel being consumed by an engine per unit of time to determine with the utmost accuracy the rate of fuel usage. Such reading can be used to determine the general condition of the engine under specific load conditions. Units 136 may be graduated for reading in volume of fluid per unit of time or weight of fluid per unit of time.

The tachometer-like instrument 132 includes counter means 138, FIG. 8, for permanently recording the volume of fluid used. This instrument may also have counter means 140 which similarly shows the volume used per unit of time or weight per unit of time but which have reset means 142 for resetting the counter means 140 back to zero. Such an instrument, which is of well known structure except for the graduated marking thereof, will thus indicate the rate of fuel usage and at the same time will record accummulated fuel usage and individual tests of fuel usage. With reference to FIG. 9, which shows a rear view of the instrument 132, adjustment means 144 are available for adjusting the operation of the instrument for a specific purpose or to correct the accuracy thereof. For example, the specific gravity of fuel may vary and it may be necessary to correct the accuracy of the instrument as related to the particular specific gravity of the fuel.

The instrument 132 may be mounted closely to the meter 16 or since it is operated by a flexible cable it may be mounted at a remote location. The present fuel system has the advantage that the meter apparatus 16 may be mounted in the engine compartment and the instrument 132 mounted in the cab for easy viewing by the driver or by test personnel.

FIG. 10 shows a system somewhat similar to FIG. 1 with the exception that a treatment tank 146 is provided in a line 148 extending from the engine 10 and connected into the fuel line 14 on the engine side of the meter apparatus 16. The system of FIG. 10 is used with an engine 10 of the type which returns unburned fuel, such as a Diesel engine. The tank 146 has means 150 against which incoming fuel impinges for removing air bubbles from the return fuel if any. The tank is vented at 152 for discharge of air. Tank 146 in addition to removing bubbles can be used to cool the fuel in order that the fuel is fed back to the engine at a proper temperature.

It is evident from the above description that line 14 constitutes a fuel line means for conducting fuel from the meter apparatus 16 to the engine 10 in bypassing relation to the treatment tank 146. My Pat. No. 3,672,394 shows such a tank. It is further evident that the line 14 constitutes a fluid flow supply line for conducting fuel directly from the meter to the engine.

FIG. 11 shows another system which includes a fuel tank 12, a fuel line 14, the metering apparatus 16 in the fuel line 14, and an engine, not shown, together with a return line 148 as in FIG. 10. Line 148 may have a treatment tank, not shown, similar to tank 146 in FIG. 10, if desired. The system of FIG. 11 differs from FIG. 10, however, in that the fuel return line 148 from the engine is connected back into the fuel tank instead of into the fuel line 14 and such return line includes a second fuel meter 16a adapted to record the flow of fuel similar to the meter 16. Since unburned fuel is returned to the tank 12, the exact amount of fuel consumed by the engine will comprise the differential of readings between meters 16 and 16a. For this purpose, the outputs from the two meters 16 and 16a are fed to a proportioning gear box 153 the output of which is fed to the tachometer-like instrument 132 by a flexible cable 154. The indication on instrument 132 will thus give the rate of fuel consumption by the engine.

FIG. 12 shows still another system which is similar to FIG. 10, employing a fuel tank 12 and a fuel line 14 leading between the tank and the engine 10. The system also employs a return line 148 having a treatment tank 146 therein. The system of FIG. 12, however, includes temperature control means 155, which serves to admit fuel to the engine at a constant temperature. Such unit has suitable cooling means controlled by a thermistor 156. In the system of FIG. 12, great accuracy of engine performance is determined from instrument 132 since the fuel is fed to the engine at the most desirable conditions.

FIG. 13 illustrates an arrangement wherein the fuel meter 16 drives a cable 122 as in previous embodiments but instead of the cable 122 driving the instrument 132 directly said cable leads to a gear box 158 having a dual output 122a and 122b in direct ratio drive. The output 122a leads to the tachometer-like instrument 132 and the output 122b leads to a recording mechanism 160. The recording mechanism is of conventional construction, comprising the usual clock driven circular chart on which is recorded by means of a stylus the rotative operation of output 122b. By means of this system, not only can personnel determine the volume of fuel being used per unit of time or weight per unit of time but in addition a permanent record is made of the fuel used per unit of time.

FIG. 14 shows a further extension yet of a concept of the invention. Its purpose is to combine the output of a meter of the type described which measures fuel usage per unit of time with the output of a speedometer to get a resultant reading of fuel usage of distance or revolutions per gallon. For example, the output cable 122 from the meter 16 operates a sensor 170 and an output cable 172 from a speedometer 174 which is driven by the drive shaft of the vehicle or, if used to designate boat engine operation, by the propeller shaft, operates a sensor 176. The output from sensors 170 and 176 are combined electrically in a voltage or pulse divider 178 to get a resultant force on an electrically operated meter 180 depicting fuel usage per unit of distance. That is, by feeding gallons per hour, for example, into sensor 170 from meter 16 and feeding miles per hour into sensor 176 from speedometer 174, the resulting output from voltage divider 178 will designate miles per gallon, or if for boat operation, knots per gallon. Meter 180 has an output for driving a recording mechanism 160 of a type previously described.

FIG. 15 shows a concept of the invention wherein a tachometer-like instrument 132' comprises an electrically operated tachometer of well known structure. For this purpose, the output shaft 119 supports and drives a gear 182 at the upper surface of head 26. Mounted on the head 26 is an electro-magnetic pickup device 184 of well known structure connected electrically to the tachometer-like instrument 132'. Rotation of the output shaft 119 is thus transferred electrically to the instrument 132' and as in other structures herein the instrument records directly the rate of fuel consumption.

Referring particularly to FIGS. 2 and 3, the bypass valve 35 is cast as an integral part of meter 16. It has a hollow interior including a bore 190 and upper and lower chambers 192 and 194, respectively, on opposite ends of the bore. Inlet 32 to the meter leads from upper chamber 192 of the valve. Forming the operative part of the valve is a stem 196 of considerably less diameter than the bore 190 and movable axially therein. Secured to upper and lower ends of the stem are diaphragms 198 and 200, respectively, abutting against shoulder portions 202 in the housing. The chambers 192 and 194 are closed at the ends by removable walls 204 and 206, respectively.

The diaphragms 198 and 200 have tapered hubs 208 and 210, respectively, engageable with the end edges of the bore 190 to control the flow of fuel through the valve. The arrangement of the parts is such that the stem 196 and the hubs 208 and 210 are movable axially a short distance, and the hubs in such axial movement are arranged to have wedging sealing abutment against one or the other of the respective end edges of the bore 190.

The valve housing has an outlet passageway 214 which extends up from chamber 194 to one side and out of communication with bore 190, and this passageway communicates with a passageway 216 extending around the valve housing and meter casing, FIG. 3, to the outlet 34 of the meter casing. An inlet passageway 218 extends from an outer side of the valve housing between bore 190 and fuel line 14.

In the operation of the valve, flow from the inlet passageway 218 and bore 190 can flow through either the inlet 32 to the meter and out outlet 34 or through outlet 214 to bypass passageway 216 and out outlet 34, depending upon the position of stem 106. That is, in a down position of the stem as shown, fuel from fuel line 14 bypasses the meter by flowing through the latter route mentioned above, namely, through passageway 218, bore 190, passageway 214, bypass passageway 216 and outlet 34 to the fuel line 14. In the up position of the stem, fuel from fuel line 14 flows through the meter 16, namely, through passageway 218, bore 190, passageway 32 and passageway 36.

The stem 196 is urged to an upper position by a compression spring 220 between end wall 206 and the stem wherein normal flow is through the meter. However, to position the stem to a down position, a lever 222 is mounted pivotally between a pair of ears 224 on top of the valve housing, and this lever has a cam end 226 in engagement with a vertical pin 228 extending slidably through the top wall 204 and abutting against the top end of stem 196. In normal metering flow, the lever 222 is thus positioned so as to allow the spring 220 to raise the stem. If it should be desirable that the fuel flow bypass the meter, the lever is positioned so as to lower the stem to the position shown in FIG. 2.

FIG. 16 shows a somewhat modified form of meter 16'. This meter, similar to the meter shown in FIGS. 2-6, has an outer casing 18', a piston 100' and mechanism for operating the plunger up and down in reciprocating motion which includes the piston rod 88 and the other structure which will not be repeated for this embodiment, including the fluid passageway means and valve means for causing the reciprocating drive movement of the plunger.

In the structure of FIG. 16, the piston or plunger 100' comprises a nut 234 secured integrally to the bottom end of piston rod, and this nut threadedly receives a shaft 236 which extends through the bottom wall of the casing in a fluid seal 237. The shaft also extends through the piston 100' and a pair of plates 238 disposed on opposite faces of the piston. These plates have arcuate or bulbular portions 240 and are constructed of metal having a high coefficient of expansion, whereby upon variation in temperature the arcuate portions expand away from and contract toward the piston. The piston carries an outer gasket 242 to provide sealing engagement with the inside surface of the casing, and the outer peripheral edges of the plates 238 extend between a flange portion 244 of the gasket and the piston. The diameter of the plates 238 is slightly less than the diameter of the piston to allow for lateral adjustment of the peripheral edge of the plates upon expansion and contraction.

Threadedly mounted on the shaft 236 on the bottom side of the piston and on the outside of the bottom plate 238 is a nut 246. The two threaded portions of the shaft 236 which engage the respective nuts 234 and 246 have opposing thread in an arrangement such that when the shaft 236 is turned in one direction the nuts draw the plates inwardly toward each other and upon rotation of the shaft 236 in the opposite direction the bulbular portions of the plates are moved apart. Compression springs 248 maintain the bulbular portions of the plates outwardly against the respective adjusting nuts.

The projecting end of shaft 236 carries a knob 250 which as best seen in FIG. 17 is associated with graduation marks 252 provided on the bottom of the casing 18'. Such graduation marks indicate adjusted rotative positions of the shaft 236 in the positioning of the bulbular portions 240 of the plates 238 relative to the piston 100' for a purpose to be described hereinafter.

As was described hereinafter in connection with the structure of FIGS. 2–5, the piston is operated by fluid in a reciprocating motion for driving indicating or counter means. In such reciprocating action, it drives a selected amount of fluid from areas on each side thereof. The structure of FIG. 16 automatically adjusts itself to meter accurately even though the volume of the fluid therein changes due to a variation in temperature. That is, the plates 238 have specific expansion and contraction characteristics such that when the fuel is warmer than a set constant, they expand away from the piston 100 to reduce the volume of the area in which the stroke of the piston occurs. By correlating the expansion characteristics of the plates 238 and the expansion characteristics of the fluid, exact metering is accomplished. If the liquid should cool below the constant, the plates 238 contract to enlarge the areas in which the piston operates. The expansion characteristics of fluids of different specific gravities may vary, and for this purpose the shaft 236 may be rotatably adjusted by knob 250 to position the plates 238 according to well known characteristics of expansion and contraction of various liquids. A proper setting of the knob 250 as determined by the specific gravity of the fuel being metered will provide accurate results.

In the embodiment of FIG. 16, the head 26' of the meter is altered relative to the structure of FIG. 1 to the extent that it contains a counter mechanism 256 of conventional construction operating on a shaft 258. One end of the shaft has a bevel gear 260 secured thereon and according to the present invention, the output shaft 119 instead of projecting through the head as in FIG. 5, has a bevel gear 262 thereon in mesh with the bevel gear 260 for driving the counter mechanism 256. The head 26' has a removable cover 264 with a transparent or window portion 266 for viewing the counter.

FIG. 18 is a fragmentary section view of a portion of the head 26' and shows an embodiment wherein an end of shaft 258' of the counter mechanism 256 has a coupling 268 with a flexible shaft assembly 270 which leads to a remote counter system or a tachometer-like instrument 132 of the type previously described. By means of the structures of FIG. 18 remote counter means may be made available in addition to the counter 256 so that even though the meter is mounted in the motor well of a vehicle, the counter can be located in the cab.

FIG. 19 shows a modified structure of the barrel cam 104'. The cam of this embodiment, while having the same slot structure and operation as described in connection with FIG. 7, employs leaf springs 274 at the ends of the cam slot 102. These springs are positioned to one side of the slot end, such positioning being on the side in which the drive pin is advancing. They are arranged such that when the pin has passed the spring, it is advanced around the turn and cannot travel back in the same segment of the slot. As the pin springs past springs 274, the cam is also urged forwardly so as to rotate smoothly and without interruption when the drive pin is at the turn.

SUMMARY

According to the present invention, a fuel system is provided which allows operators to not only operate an engine in the most efficient manner but also to examine fuel usage to test the condition of the engine. That is, by viewing on the instrument 132 the volume of fuel being used per unit of time or weight per unit of time under a particular load condition, a most efficient method is available of directly ascertaining engine efficiency and consequently whether or not the engine needs repair or overhaul. Such method has important advantages over other types of engine tests because an accurate knowledge of fuel consumption based on a particular load gives a direct indication without variables of the engine's condition.

The system of FIG. 12 is even more accurate in that the fuel is always fed to the engine at optimum conditions for greater efficiency. The structure of FIG. 16 wherein adjustment is made for the temperature of the fuel provides for even greater efficiency, and it is to be understood that such type of meter can be used with any of the systems disclosed herein. Adjustment of the expansion means in the meter of FIG. 16 according to the specific gravity of the fuel is accomplished by adjusting knob 250. In connection with the embodiment of FIG. 16, the output shaft 258' can drive a flexible cable assembly 122 as in the embodiment of FIGS. 2–5 wherein the meter casing 18' can be placed in the motor well and the indicator or counter means driven thereby can be placed in the cab or other place which is convenient for inspection.

The present system may be used in conjunction with almost any engine of the fuel burning type such as automotive, marine or stationary engines. The throttle of an engine may be set by use of the present rate meter rather than by revolutions per minute.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A temperature controlled fuel measuring system arranged for use with an engine having fuel supply means and in which a portion of the fuel fed thereto is unburned and including a return line from the engine arranged to return unburned fuel back to the fuel supply means, said fuel system comprising control means having means operably associating it with said fuel system, said control means controlling the temperature of fuel supplied to the engine, volumetric measuring means having means for connection in the fuel supply of the engine for measuring fuel supplied to the engine, volumetric measuring means having means for connection in the return line of the engine for measuring return fuel flow in the return line, each of said measuring means having a fuel flow measurement output, means responsive to said two measuring means outputs determining an output which comprises the differential in output of said two measuring means, and indicating means totalizing said differential of fuel flowing through said measuring means.

2. The temperature controlled fuel measuring system of claim 1 including bubble removing means having means for connection in at least one of the fuel supply means and the return line.

3. A temperature controlled fuel measuring system arranged for use with an engine having fuel supply means and in which a portion of the fuel fed thereto is unburned and including a return line from the engine arranged to return unburned fuel back to the fuel supply means, said fuel system comprising control means having means operably associating it with said fuel system, said control means controlling the temperature of fuel supplied to the engine, volumetric measuring means having means for connection in the fuel supply of the engine for measuring fuel supplied to the engine, volumetric measuring means having means for connection in the return line of the engine for measuring return fuel flow in the return line, each of said measuring means having a fuel flow measurement output, means responsive to said two measuring means outputs determining an output which comprises the differential in output of said two measuring means, and recording means recording said differential of fuel flowing through said measuring means.

4. The temperature controlled fuel measuring system of claim 3 including bubble removing means having means for connection in at least one of the fuel supply means and the return line.

5. A temperature controlled fuel measuring system arranged for use with an engine having fuel supply means and in which a portion of the fuel fed thereto is unburned and including a return line from the engine arranged to return unburned fuel back to the fuel supply means, said fuel system comprising control means having means operably associating it with said fuel system, said control means controlling the temperature of fuel supplied to the engine, volumetric measuring means having means for connection in the fuel supply of the engine for measuring fuel supplied to the engine, volumetric measuring means having means for connection in the return line of the engine for measuring return fuel flow in the return line, each of said measuring means having a fuel flow measurement output, means responsive to said two measuring means outputs determining an output which comprises the differential in output of said two measuring means, and indicating means indicating the rate of said differential of fuel flowing through said measuring means.

6. The temperature controlled fuel measuring system of claim 5 including bubble removing means having means for connection in at least one of the fuel supply means and the return line.

7. A temperature controlled fuel measuring system arranged for use with an engine having fuel supply means and in which a portion of the fuel fed thereto is unburned and including a return line from the engine arranged to return unburned fuel back to the fuel supply means, said fuel system comprising control means having means operably associating it with said fuel system, said control means controlling the temperature of fuel supplied to the engine, volumetric measuring means having means for connection in the fuel supply of the engine for measuring fuel supplied to the engine, volumetric measuring means having means for connection in the return line of the engine for measuring return fuel flow in the return line, each of said measuring means having a fuel flow measurement output, means responsive to said two measuring means outputs determining an output which comprises the differential in output of said two measuring means, and recording means recording the rate of said differential of fuel flowing through said measuring means.

8. The temperature controlled fuel measuring system of claim 7 including bubble removing means having means for connection in at least one of the fuel supply means and the return line.

9. A temperature controlled fuel measuring system in combination with an engine fuel supply means for said engine, said engine being of the type in which a portion of the fuel fed thereto is unburned, a return line from said engine arranged to return unburned fuel back to said engine, control means arranged to control the temperature of fuel supplied to said engine, volumetric measuring means in said fuel supply means measuring fuel supplied to said engine, volumetric measuring means in said return line measuring return fuel flow in said return line, each of said measuring means having a fuel flow measurement output, means responsive to said two measuring means outputs determining an output which comprises the differential in output of said two measuring means, and indicating means totalizing said differential of fuel flowing through said measuring means.

10. A temperature controlled fuel system arranged for use with an engine having fuel supply means and in which a portion of the fuel fed to the engine is unburned and including a return line from the engine receiving unburned fuel and routing it for re-supply to the engine, said fuel system comprising treatment means having means for connection in said fuel system, fuel line means in said fuel system arranged to conduct fuel from the fuel supply means to the engine in bypassing relation to said treatment means, sensing means operable with said fuel system sensing the temperature of the fuel supplied to the engine, and temperature control means responsive to said sensing means regulating the temperature of fuel supplied to the engine.

11. The temperature controlled fuel system of claim 10 wherein said treatment means is thermally associated with said temperature control means.

12. The temperature controlled fuel system of claim 11 wherein said treatment means comprises cooling means for the fuel.

13. A temperature controlled fuel system arranged for use with an engine having fuel supply means and in which a portion of the fuel fed to the engine is unburned and including a return line from the engine receiving unburned fuel and routing it for re-supply to the engine, said fuel system comprising a treatment tank having means for connection in said fuel system, bubble removing means located within said tank, sensing means operable with said fuel system sensing the temperature of the fuel supplied to the engine, and temperature control means responsive to said sensing means regulating the temperature of fuel supplied to the engine.

14. A temperature controlled fuel system arranged for use with an engine having fuel supply means and in which a portion of the fuel fed to the engine is unburned and including a return line from the engine receiving unburned fuel and routing it for re-supply to the engine, said fuel system comprising sensing means for sensing the temperature of the fuel supplied to the engine, temperature control means responsive to said sensing means regulating the temperature of the fuel delivered to the engine, bubble removing means having means for connection in said system, and fuel line means in said fuel system arranged to conduct fuel from the fuel supply means to the engine in bypassing relation to said bubble removing means.

15. A temperature controlled fuel measuring system arranged for use with an engine having fuel supply means and in which a portion of the fuel fed thereto is unburned and including a return line from the engine receiving unburned fuel and routing it for subsequent re-supply to the engine, said fuel system comprising treatment means having means for connection in said fuel system, volumetric fuel measuring means measuring fuel flow in said system, sensing means operable with said fuel system sensing the temperature of the fuel supplied to the engine, temperature control means responsive to said sensing means regulating the temperature of fuel supplied to the engine, indicating means responsive to said measuring means indicating the total amount of fuel flowing through said measuring means, and compensating means in said fuel system correcting the indications of said indicating means due to variations in the physical characteristics of the fuel.

16. A temperature controlled fuel measuring system arranged for use with an engine having fuel supply means and in which a portion of the fuel fed thereto is unburned and including a return line from the engine receiving unburned fuel and routing it for subsequent re-supply to the engine, said fuel system comprising treatment means having means for connection in said fuel system, volumetric fuel measuring means measuring fuel flow in said system, sensing means operable with said fuel system sensing the temperature of the fuel supplied to the engine, temperature control means responsive to said sensing means regulating the temperature of fuel supplied to the engine, recording means responsive to said measuring means recording the total amount of fuel flowing through said measuring means, and compensating means in said fuel system correcting the recording of said recording means due to variations in the physical characteristics of the fuel.

17. A temperature controlled fuel measuring system arranged for use with an engine having fuel supply means and in which a portion of the fuel fed thereto is unburned and including a return line from the engine receiving unburned fuel and routing it for subsequent re-supply to the engine, said fuel system comprising treatment means having means for connection in said fuel system, volumetric fuel measuring means measuring fuel flow in said system, sensing means operable with said fuel system sensing the temperature of the fuel supplied to the engine, temperature control means responsive to said sensing means regulating the temperature of fuel supplied to the engine, indicating means responsive to said measuring means indicating the rate of fuel flowing through said measuring means, and compensating means in said fuel system correcting the indications of said indicating means due to variations in the physical characteristics of the fuel.

18. A temperature controlled fuel measuring system arranged for use with an engine having fuel supply means and in which a portion of the fuel fed thereto is unburned and including a return line from the engine receiving unburned fuel and routing it for subsequent re-supply to the engine, said fuel system comprising treatment means having means for connection in said fuel system, volumetric fuel measuring means measuring fuel flow in said system, sensing means operable with said fuel system sensing the temperature of the fuel supplied to the engine, temperature control means responsive to said sensing means regulating the temperature of fuel supplied to the engine, recording means responsive to said measuring means recording the rate of fuel flowing through said measuring means, and compensating means in said fuel system correcting the recording of said recording means due to variations in the physical characteristics of the fuel.

19. A temperature controlled fuel measuring system arranged for use with an engine having fuel supply means and in which a portion of the fuel fed thereto is unburned and including a return line from the engine receiving unburned fuel and routing it for re-supply to the engine, said fuel system comprising treatment means having means for connection in said fuel system, volumetric fuel measuring means measuring fuel flow in said system, said measuring means having means for connection prior to the combining of the return fuel and the fuel supply means, sensing means operable with said fuel system sensing the temperature of the fuel supplied to the engine, temperature control means responsive to said sensing means regulating the temperature of fuel supplied to the engine, and indicating means responsive to said measuring means indicating the total amount of fuel flowing through said measuring means.

20. The temperature controlled fuel system of claim 19 wherein said treatment means is thermally associated with said temperature control means.

21. A temperature controlled fuel measuring system arranged for use with an engine having fuel supply means and in which a portion of the fuel fed thereto is unburned and including a return line from the engine receiving unburned fuel and routing it for re-supply to the engine, said fuel system comprising treatment means having means for connection in said fuel system, volumetric fuel measuring means measuring fuel flow in said system, said measuring means having means for connection prior to the combining of the return fuel and the fuel supply means, sensing means operable with said fuel system sensing the temperature of the fuel supplied to the engine, temperature control means responsive to said sensing means regulating the temperature of fuel supplied to the engine, and recording means responsive to said measuring means recording the total amount of fuel flowing through said measuring means.

22. The temperature controlled fuel system of claim 21 wherein said treatment means is thermally associated with said temperature control means.

23. A temperature controlled fuel measuring system arranged for use with an engine having fuel supply means and in which a portion of the fuel fed thereto is unburned and including a return line from the engine receiving unburned fuel and routing it for re-supply to the engine, said fuel system comprising treatment means having means for connection in said fuel system, volumetric fuel measuring means measuring fuel flow in said system, said measuring means having means for connection prior to the combining of the return fuel and the fuel supply means, sensing means operable with said fuel system sensing the temperature of the fuel supplied to the engine, temperature control means responsive to said sensing means regulating the temperature of fuel supplied to the engine, and indicating means responsive to said measuring means indicating the rate of fuel flowing through said measuring means.

24. The temperature controlled fuel system of claim 23 wherein said treatment means is thermally associated with said temperature control means.

25. A temperature controlled fuel measuring system arranged for use with an engine having fuel supply means and in which a portion of the fuel fed thereto is unburned and including a return line from the engine receiving unburned fuel and routing it for re-supply to the engine, said fuel system comprising treatment means having means for connection in said fuel system, volumetric fuel measuring means measuring fuel flow in said system, said measuring means having means for connection prior to the combining of the return fuel and the fuel supply means, sensing means operable with said fuel system sensing the temperature of the fuel supplied to the engine, temperature control means responsive to said sensing means regulating the temperature of fuel supplied to the engine, and recording means responsive to said measuring means recording the rate of fuel flowing through said measuring means.

26. The temperature controlled fuel system of claim 25 wherein said treatment means is thermally associated with said temperature control means.

27. A temperature controlled fuel measuring system arranged for use with an engine having fuel supply means, said fuel system comprising volumetric measuring means measuring fuel flow in said fuel system, sensing means operable with said fuel system sensing the temperature of the fuel supplied to the engine, temperature control means responsive to said sensing means regulating the temperature of the fuel delivered to the engine, indicating means responsive to said measuring means indicating the total amount of fuel flowing through said measuring means, and compensating means in the fuel system correcting the indications of said indicating means due to variations in the physical characteristics of the fuel.

28. A temperature controlled fuel measuring system for use with an engine having fuel supply means, said fuel system comprising volumetric measuring means measuring fuel flow in said fuel system, sensing means operable with said fuel system sensing the temperature of the fuel supplied to the engine, temperature control means responsive to said sensing means regulating the temperature of the fuel delivered to the engine, recording means responsive to said measuring means recording the total amount of fuel flowing through said measuring means, and compensating means in the fuel system correcting the recording of said recording means due to variations in the physical characteristics of the fuel.

29. A temperature controlled fuel measuring system arranged for use with an engine having fuel supply means, said fuel system comprising volumetric measuring means measuring fuel flow in said fuel system, sensing means operable with said fuel system sensing the temperature of the fuel supplied to the engine, temperature control means responsive to said sensing means regulating the temperature of the fuel delivered to the engine, indicating means responsive to said measuring means indicating the rate of fuel flowing through said measuring means, and compensating means in the fuel system correcting the indications of said indicating means due to variations in the physical characteristics of the fuel.

30. A temperature controlled fuel measuring system arranged for use with an engine having fuel supply means, said fuel system comprising volumetric measuring means measuring fuel flow in said fuel system, sensing means operable with said fuel system sensing the temperature of the fuel supplied to the engine, temperature control means responsive to said sensing means regulating the temperature of the fuel delivered to the engine, recording means responsive to said measuring means recording the rate of fuel flowing through said measuring means, and compensating means in the fuel system correcting the recording of said recording means due to variations in the physical characteristics of the fuel.

31. A temperature controlled fuel measuring system arranged for use with an engine having fuel supply means, said fuel system comprising volumetric measuring means measuring fuel flow in said fuel system, sensing means operable with said fuel system sensing the temperature of the fuel supplied to the engine, temperature control means responsive to said sensing means regulating the temperature of the fuel delivered to the engine, compensating means in said system arranged to compensate the measurement of said measuring means for variations in the temperature of the fuel, and indicating means responsive to said measuring means indicating the total amount of fuel flowing through said measuring means.

32. A temperature controlled fuel measuring system arranged for use with an engine having fuel supply means, said fuel system comprising volumetric measuring means measuring fuel flow in said fuel system, sensing means operable with said fuel system sensing the temperature of the fuel supplied to the engine, temperature control means responsive to said sensing means regulating the temperature of the fuel delivered to the engine, compensating means in said system arranged to compensate the measurement of said measuring means for variations in the temperature of the fuel, and recording means responsive to said measuring means recording the total amount of fuel flowing through said measuring means.

33. A temperature controlled fuel measuring system arranged for use with an engine having fuel supply means, said fuel system comprising volumetric measuring means measuring fuel flow in said fuel system, sensing means operable with said fuel system sensing the temperature of the fuel supplied to the engine, temperature control means responsive to said sensing means regulating the temperature of the fuel delivered to the engine, compensating means in said system arranged to compensate the measurement of said measuring means for variations in the temperature of the fuel, and indicating means responsive to said measuring means indicating the rate of fuel flowing through said measuring means.

34. A temperature controlled fuel measuring system arranged for use with an engine having fuel supply means, said fuel system comprising volumetric measuring means measuring fuel flow in said fuel system, sensing means operable with said fuel system sensing the temperature of the fuel supplied to the engine, temperature control means responsive to said sensing means regulating the temperature of the fuel delivered to the engine, compensating means in said system arranged to compensate the measurement of said measuring means for variations in the temperature of the fuel, and recording means responsive to said measuring means recording the rate of fuel flowing through said measuring means.

* * * * *